Jan. 30, 1940.                D. B. DICKINSON                2,188,677
           PORTABLE CONDITION FINDER FOR INVISIBLE PARTS OF AUTOMOBILES
                        Filed Sept. 30, 1938            2 Sheets-Sheet 1
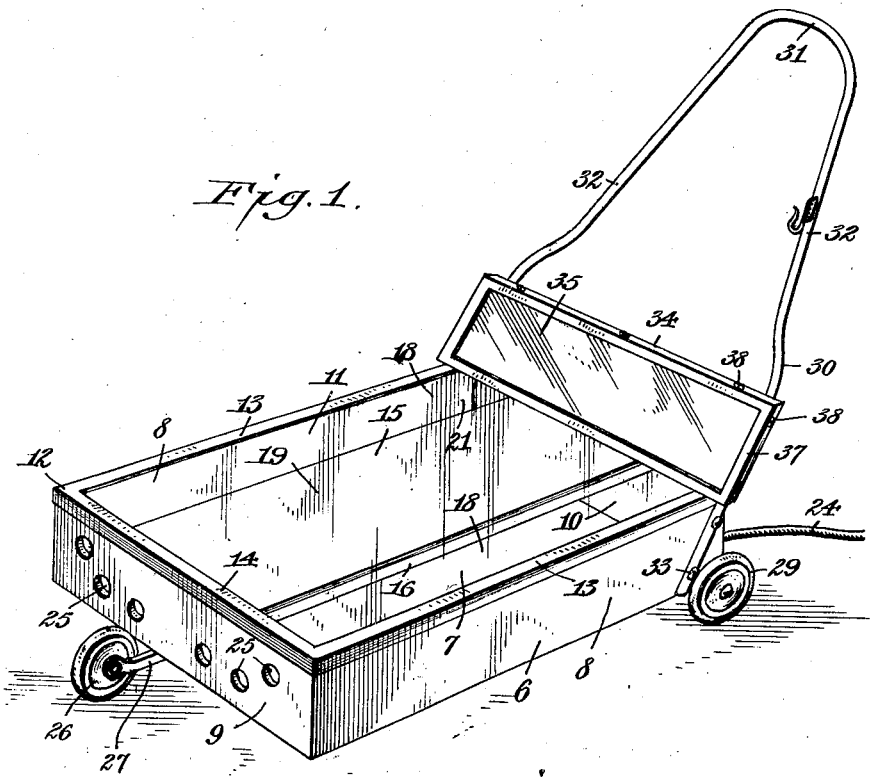
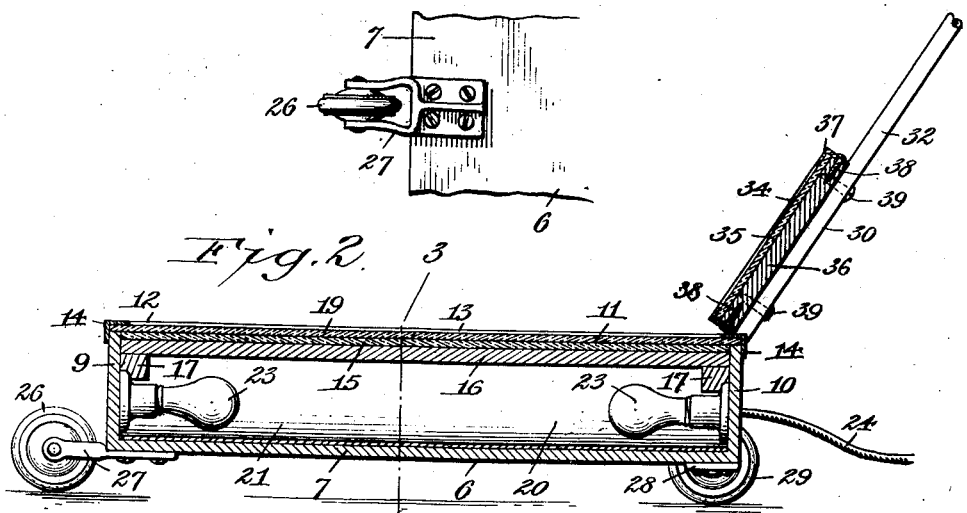
Donald B. Dickinson, Inventor.
By Emil Neuhart
                Attorney Jan. 30, 1940.                D. B. DICKINSON                2,188,677
         PORTABLE CONDITION FINDER FOR INVISIBLE PARTS OF AUTOMOBILES
                        Filed Sept. 30, 1938           2 Sheets-Sheet 2

Donald B. Dickinson,
Inventor.
By Emil Kuhbach
Attorney

Patented Jan. 30, 1940

2,188,677

UNITED STATES PATENT OFFICE 2,188,677

PORTABLE CONDITION FINDER FOR INVISIBLE PARTS OF AUTOMOBILES

Donald B. Dickinson, Silver Creek, N. Y.

Application September 30, 1938, Serial No. 232,634

8 Claims. (Cl. 240—4.2)

This invention relates to a portable reflector device, and more particularly to what may be termed a condition finder for invisible parts of automobiles.

The primary object of my invention is to provide a portable reflector for use in garages and at service stations to enable attendants to examine the under side of an automobile and to ascertain whether parts thereof, otherwise invisible, are loose, or inoperative, and whether proper lubrication has been provided where lubrication is required.

A further object of my invention is to provide a portable reflector which will at all times be conveniently at hand and capable of being moved underneath an automobile and if required, be tilted to not only enable parts on the under side of the automobile located centrally thereon to be easily seen, but also to reflect parts located at the sides of the automobile, as well as parts distantly located with respect to the reflector, so that the entire under side of the automobile will be brought into reflected vision even though the reflector be positioned only under a portion of the automobile.

Another object of my invention is to provide a reflector of the kind mentioned wherein supporting points for the same are provided under triangular arrangement so that the reflector can be easily tilted on one end laterally, or with a forward or rearward inclination componently with a lateral inclination.

A still further object of my invention is to provide a reflector of the type mentioned, wherein a box-like structure is provided equipped with artificial light and with a reflecting element, a reflecting mirror in a plane above said reflecting element and between which and said reflecting element the artificial lights are disposed and wherein light openings are provided through which the reflecting element is caused to illuminate the under side of the automobile and display the same in said reflecting mirror.

With the above and other objects in view to appear hereinafter, my invention consists in the novel features of construction and in the arrangement and combination of parts to be hereinafter described and more particularly pointed out in the subjoined claims.

In the drawings,

Fig. 1 is a perspective view of my improved portable reflector device.

Fig. 2 is a longitudinal section through the same with one end of the handle thereof broken away.

Fig. 5 is a bottom view of a portion of the front end of the device.

Figure 3:
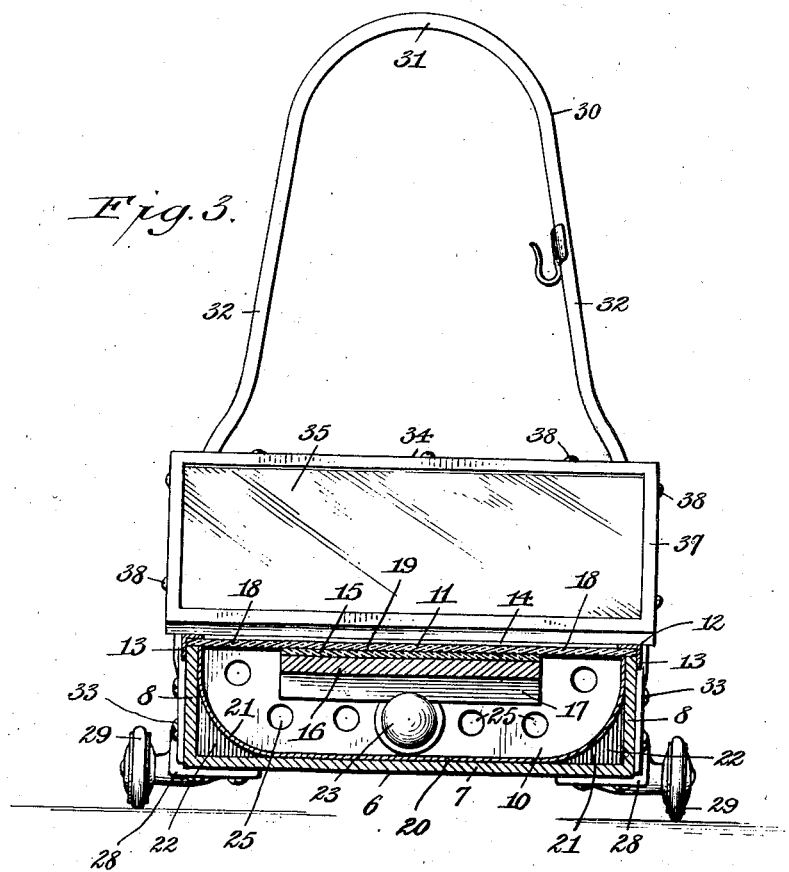
Fig. 3 is a transverse section taken on line 3—3, Fig. 2.
Figure 4:
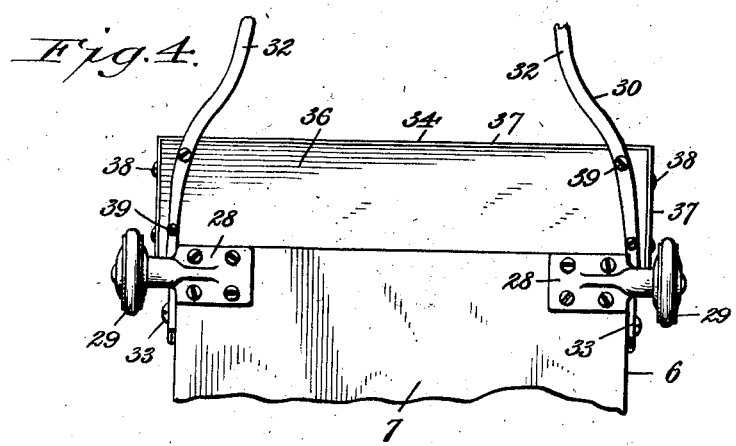
Fig. 4 is a bottom plan view of the rear end of the device with the outer end of the handle broken away.

The device is preferably of oblong formation and is designed to be moved underneath automobiles, which invariably are of greater length than width, and by reason of this formation is intended to reflect substantially the full length of the under side of the automobile.

The device comprises a shallow elongated box-like structure 6 which in the main is formed of wood but may be constructed of any other suitable opaque material. This box-like structure comprises a bottom 7, side walls 8, front and rear walls 9 and 10. It also has a glass or other transparent top wall 11, which has its marginal portion resting upon the upper edges of the side walls 8 and end walls 9 and 10, and may be retained thereon in any suitable manner. I, however, employ metallic angle strips 12, one web of each covering an edge of the transparent top wall 11 and overlapping a side or end wall of the box-like structure and the other overlying a marginal portion of said transparent top wall. These metallic angle strips may be fastened in place in any suitable manner. I have shown these strips forming a rectangular frame in which the side members 13 are welded or otherwise connected to the end members 14, and therefore are capable of being slipped over the box-like structure and thus retain the transparent top wall in place. If desired, however, screws may be passed through the depending webs of these angular strips and enter the walls of the box-like structure. These angular strips of course may also be individually applied and fastened in place by means of screws or otherwise.

Placed in contact with the under side of the transparent top wall 11 is an elongated reflecting mirror 15 which is somewhat narrower than the transparent top wall, and the longitudinal edges of this mirror are therefore spaced from the side walls 8 of the box-like structure. This mirror is held in contact with the under side of the transparent wall by a supporting board 16 corresponding in length and width with the mirror and held in contact with the under or prepared side of the mirror by securing-strips 17 fastened to the inner sides of the end walls 9 and 10. In this manner the transparent top wall 11 has narrow transparent light-passing regions 18 at opposite sides and a reflecting region 19 between said transparent regions; the reflecting region being created by the somewhat narrower mirror which, however, is co-extensive with the length of said transparent top wall.

The supporting board 16 may be formed of wood or other rigid material, but I prefer to utilize for this element suitable insulating material. The bottom and side walls are faced with chromium-plated or otherwise highly finished sheet-metal serving as a reflector 20, this sheet-metal being rounded, as at 21, with these rounded portions spaced from the angles formed by the bottom and side walls of the box-like structure, as shown at 22, the purpose of these rounded portions being to deflect rays of light upwardly through the transparent or light-passing regions 18 of the transparent top wall 11.

I position within the box-like structure electric bulbs 23 which are connected in any approved manner with the wires within a current conducting cord 24, which may be of any desired length and have means of connection with a plug-socket or the like located in any suitable place so that current will be supplied to the electric bulbs whenever the device is placed in use. The manner of connecting the electric cord to the light bulbs 23 will of course be apparent and requires no particular illustration or explanation.

These light bulbs 23 will create considerable heat within the box-like structure, and thus, as stated, I prefer to use for the element 16 some material that will protect the prepared under side of the mirror from the effects of the heat; and I also arrange air openings 25 in the end walls for the escape of the heat from within the structure. These light bulbs are preferably fastened to the opposite end walls 9 and 10 directly underneath the mirror support or supporting board 16, and are therefore invisible from the top. The rays of light from these bulbs are directed against the polished surface of the lining or reflector 20, and in striking the curved portions 21 of the latter are directed upwardly through the transparent regions 18 of the transparent top wall. Thus, when the device is placed underneath an automobile, the under side of the automobile is reflectively visible in the mirror 15.

At the front end of the box-like structure a traction wheel 26 is rotatably mounted in a bracket 27 fastened to the under side of the structure. This wheel is disposed in the longitudinal center of the body, and at the rear corners brackets 28 are secured having spindles projecting therefrom on which additional traction wheels 29 are rotatably mounted. The traction wheels 26 and 29 provide a three-point support for the device which enables the device to be easily moved about. Such arrangement also permits the device to be readily tipped forward and thus be supported only by the traction wheel 26; or it may be easily tilted laterally so that it may be supported only by means of one of the two traction wheels 29 at the rear end thereof; or it may be easily tilted in a manner so that support is provided by the traction wheel 26 and one of the traction wheels 29. The tilting of the device in the manner stated enables reflected views to be had of all parts of the automobile ordinarily concealed so that any loose parts will be discovered, as well as leakage of oil or the need of lubricant. The wheels 26 and 29 convert the box-like body portion into what may be termed a cart.

In order to enable the device to be conveniently transported from place to place, and especially with a view of rolling the same underneath an automobile in a position in which the reflecting mirror is substantially parallel to the surface on which the automobile rests, and also to enable the device to be conveniently tilted in the manner stated, I have provided an upwardly and rearwardly-directed handle 30 which comprises a rounded upper portion 31, and two downwardly and forwardly-inclined spaced-apart side members 32 which have their lower ends secured to opposite sides of the body portion at the rear end thereof, as at 33. By directing the handle upwardly and rearwardly and providing the two spaced-apart side members 32, the device may be easily tilted by grasping the side members with both hands and exerting the pressure thereon as needed for tilting the device forwardly, laterally, or forwardly with component lateral movement, depending on the particular part of the automobile it is desired to examine. This is especially facilitated by the use of the three-point support provided by the traction wheels 26 and 29.

The device is short compared to automobiles under which it is to be rolled, and therefore I provide at one end thereof, preferably the rear end, a reflecting element 34 in the form of a mirror. This may be of any construction, but in order to match or conform to the appearance of the body portion it comprises the glass mirror 35 proper, a backing 36 to protect the prepared face of the glass mirror, and an angular binding 37 similar to the angle strips 12 of the body portion, one web of which binding bears against the marginal portion of the mirror and the other against the edges of the latter and the edges of the backing 36, the binding being fastened in place by screws 38 passed therethrough and threaded into the backing. This reflecting mirror is comparatively narrow and long, and the length thereof is approximately the width of the body portion of the device.

In the particular arrangement shown, this reflecting mirror is inclined upwardly and rearwardly, the inclination being that of the handle 30. It rests at its lower edge against the metallic angle strips 12 of the body portion and against the spaced-apart side members 32 of the handle, and is fastened to the latter by means of screws 39 passed through said side members and threaded into the backing 36.

One attendant at a garage or service station can conveniently roll the device underneath an automobile from the rear end thereof while another attendant is servicing the automobile otherwise. Thus the owner of the automobile can be informed of any attention required underneath the car, such as the tightening of loose parts or the greasing of joints, cups, or other parts which appear to be dry, and in many instances correction made or attention given which would result in avoiding accidents, most of which parts, if not all, may be observed by the attendant while in an upright position.

It is to be noted that the traction wheels are comparatively small in diameter so that the portion of the device to be placed underneath the car need not exceed seven inches in height, thus making it possible to roll the device underneath the differential casing of an automobile. Since the under side of the automobile is illuminated by the reflection of light from the light bulbs 23 through said light regions or spaces 18, and in turn is reflected in the reflecting mirror 19, it can be easily determined whether lubrication of parts is required, parts are loose or broken, or some other service is necessary. A slight tilting laterally of the device will expose the brake drums, the inner sides of the automobile wheels and tires, also the under sides of the running boards, so that any loose or worn parts or any injuries to the tires can be easily seen. Moreover, the reflecting mirror 35 will reflect the under side of the automobile along that portion forward of the device; it being only necessary to stoop slightly to bring the line of vision along the entire length of the automobile, or the device may be tilted on end for this purpose. If desired, however, the device may also be rolled underneath the forward end of the automobile, and when tilted laterally underneath both forward and rearward ends, every part of the automobile not otherwise visible from a standing or stooping position will be brought to view.

Having thus described my invention, what I claim is:

1. A portable reflector device, comprising an upwardly-facing reflecting mirror, means supporting said reflecting mirror to enable the latter to be moved underneath an automobile substantially parallel to the surface on which the latter rests, and means associated with said reflecting mirror to illuminate the under side of the automobile and cause a clear reflection of the illuminated portion of said under side in said reflecting mirror.

2. A portable reflector device, comprising an upwardly-facing reflecting mirror, wheels supporting said mirror to enable the latter to be moved underneath an automobile between the wheels at opposite sides thereof with said reflecting mirror substantially parallel to the surface on which the automobile rests, a light bulb disposed underneath said mirror, and means beneath the plane of said mirror to reflect the rays of light from said light bulb upwardly against the under side of the automobile so as to enable said under side to be clearly reflected within said mirror so as to be seen from the front, the rear, or either side of the automobile.

3. A portable reflector device, comprising a cart having an elongated box-like body portion capable of being positioned underneath an automobile between the wheels at opposite sides thereof and constructed with a bottom, side walls, and end walls and having an elongated reflecting mirror at the top parallel to the surface on which the automobile rests and facing upwardly when said body portion is so positioned, said mirror being of a width to provide a light space between at least one longitudinal edge thereof and one of the side walls of said box-like body portion, a light bulb within said body portion arranged underneath said mirror, and a polished reflector element beneath said light space directing the rays of light from said light bulb upwardly against the under side of an automobile through said light space to illuminate parts of the automobile otherwise concealed and to cause the illuminated portion of the automobile to be reflected in said reflecting mirror.

4. A portable reflector device, comprising a cart having a three-point support and adapted to be rolled underneath an automobile to permit said cart to be tilted forwardly, rearwardly, laterally, or forwardly or rearwardly with component lateral movement, means carried within the cart for illuminating the under side of the automobile, and means to reflect the illuminated under side of the automobile at the top of the cart, said three-point support permitting an observer under the selective above-mentioned tilting movements to obtain a reflected view of the side concealed portions of the automobile including the running board, traction wheels and adjacent portions of the automobile.

5. A portable reflector device, comprising a cart having an elongated box-like body portion adapted to be positioned underneath an automobile between the wheels at opposite sides thereof and constructed with a bottom, side walls, and end walls and having an upwardly-facing mirror at the top positioned lengthwise and centrally of said body portion and normally substantially parallel to the surface on which the automobile rests, said mirror being narrower than said body portion to provide light spaces at opposite sides thereof, light bulbs disposed within said body portion to illuminate the under side of an automobile, and a mirror transversely disposed at one end of said body portion above the plane of said upwardly-facing mirror and inclined to reflect portions of the bottom of the automobile not located directly above said body portion.

6. A portable reflector device, comprising a cart having a box-like body portion adapted to be positioned underneath an automobile between the wheels at opposite sides thereof and provided at its top with an upwardly-facing mirror disposed substantially parallel to the surface on which the automobile rests, said mirror being narrower than said body portion to provide a light space at one side of said mirror, wheels of small diameter supporting said body portion, a light bulb within said body portion, a reflector element within said body portion against which rays of light from said light bulb are directed and whereby said rays are reflected against the under side of portions of an automobile, and a mirror disposed at an angle to said upwardly-facing mirror to reflect portions of the bottom of the automobile not directly disposed over said box-like body portion.

7. A portable reflector device, comprising a cart having a rectangular elongated body portion constructed with a bottom, side walls, and end walls, a mirror arranged lengthwise centrally of said body portion at the top thereof, a traction wheel of small diameter arranged medially at one end of said body portion, other traction wheels at the corners of said body portion at the other end thereof, said wheels providing a three-point support for said cart to permit of tilting the same forwardly, rearwardly, or laterally while beneath the automobile, means within said body portion to direct rays of light upwardly against the under side of an automobile to illuminate the same and to cause the illuminated region of the automobile to be reflected in said mirror, and a handle extending upwardly and outwardly from the last-mentioned end of said body portion to permit of so tilting said cart.

8. A portable reflector device, comprising a cart having a rectangular elongated body portion constructed with an opaque bottom and opaque side and end walls, a top wall formed of glass entirely closing the top of said box-like body portion, an upwardly-facing elongated mirror positioned in contact with the under side of said glass top wall lengthwise and centrally of said body portion, said mirror being narrower than and as long as said glass top wall to provide light spaces between the longitudinal edges thereof and said side walls, an insulated supporting board co-extensive laterally and longitudinally with said mirror and receiving support from the end walls of said body portion, a light bulb secured to each of said end walls and positioned medially underneath said insulated supporting board, a reflector element formed of bright sheet material within said body portion and having concaved inner surfaces at opposite sides thereof directly underneath said light spaces, said reflector element receiving the rays of light from said light bulbs and reflecting them upwardly through said light spaces, and a handle for said cart extending upwardly and outwardly from one end thereof.

DONALD B. DICKINSON.